United States Patent [19]

Stawitz et al.

[11] Patent Number: 4,845,213

[45] Date of Patent: Jul. 4, 1989

[54] PROCESS FOR PREPARING TRIPHENDIOXAZINE COMPOUNDS

[75] Inventors: Josef-Walter Stawitz, Odenthal; Wolfgang Harms, Leverkusen, both of Fed. Rep. of Germany

[73] Assignee: Bayer Aktiengesellschaft, Leverkusen, Fed. Rep. of Germany

[21] Appl. No.: 202,858

[22] Filed: Jun. 6, 1988

[30] Foreign Application Priority Data

Jun. 20, 1987 [DE] Fed. Rep. of Germany ....... 3720477

[51] Int. Cl.$^4$ ............................................. C07D 498/04
[52] U.S. Cl. ........................................ 544/76; 544/75; 544/77
[58] Field of Search ............................. 544/76, 75, 77

[56] References Cited

U.S. PATENT DOCUMENTS 4,532,323 7/1985 Jäger ................................. 544/76 X
4,628,086 12/1986 Franke .............................. 544/76 X Primary Examiner—Richard L. Raymond
Attorney, Agent, or Firm—Sprung Horn Kramer & Woods

[57] ABSTRACT

A novel, simple process for preparing triphendioxazines by oxidative cyclization of 2,5-diarylaminobenzoquinones in sulphuric acid which, if necessary, contains sulphur trioxide consists in using as an oxidizing agent chlorine, bromine or an inorganic bromine compound.

6 Claims, No Drawings

PROCESS FOR PREPARING TRIPHENDIOXAZINE COMPOUNDS

The present invention relates to a novel process for preparing triphendioxazine compounds by oxidative cyclization of 2,5-diarylaminobenzoquinones in sulphuric acid or sulphuric acid containing sulphur trioxide, characterized in that the oxidizing agent used is chlorine, bromine or an inorganic bromine compound.

Inorganic bromine compounds which may be mentioned are for example: sodium and potassium bromide, sodium and potassium bromate and also hydrobromic acid.

In this process, about 0.5 to 10, preferably 0.5 to 3 moles of chlorine, bromine or inorganic bromine compounds are used per mole of 2,5-diarylaminobenzoquinone.

The cyclization is in general carried out at 0° to 60° C., preferably at 10° to 30° C.

The reaction medium employed is preferably concentrated sulphuric acid, monohydrate or fuming, containing up to 50% of sulphur trioxide. The choice of the suitable reaction medium depends mainly on the diarylaminobenzoquinone and the cyclization agent. In the case of 2,5-diarylaminobenzoquinones which can be sulphated relatively easily, concentrated sulphuric acid up to about 5% strength fuming sulphuric acid is preferred. In other cases, due to the short reaction times which can be obtained by this method, 10 to 50% strength fuming sulphuric acid, very particularly 10 to 30% strength fuming sulphuric acid is preferred.

Examples of 2,5-diarylaminobenzoquinone compounds which can be used according to the invention as starting compounds and which may be mentioned are compounds of the general formula

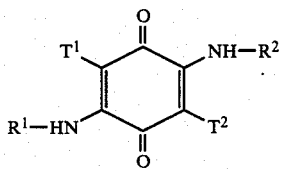

(I)

in which
T$^1$, T$^2$ are independently of each other H, Cl, Br, C$_1$-C$_4$-alkoxy, C$_1$-C$_4$-alkyl, optionally substituted phenyl or phenoxy radicals,
R$^1$, R$^2$ are independently of each other optionally substituted phenyl, naphthyl, carbazolyl, fluorenyl, chrysenyl or pyrenyl radicals.

Suitable substituents for the optionally substituted phenyl or phenoxy radicals T$^1$ and T$^2$ are for example Cl, CH$_3$, C$_2$H$_5$, OCH$_3$, OC$_2$H$_5$ and NO$_2$.

Suitable substituents for R$^1$ and R$^2$ are for example as follows:

Alkyl, such as methyl, ethyl, n-propyl, n-butyl, cyclohexyl, alkoxy, such as methoxy, ethoxy, isopropoxy, cyclohexyloxy, fluorine, chlorine, bromine, carboxyl, sulpho, sulphamoyl, acylamino, such as acetylamino, propionylamino, ureido, benzoylamino, amino, alkylamino such as methylamino, ethylamino, β-aminoethylamino, γ-aminopropylamino, γ-dimethylaminopropylamino, aryloxy, such as phenoxy, arylamino such as anilino, benzylamino, cyclohexylamino, arylthio, phenyl, benzyl, phenylureido, β-hydroxyethylsulphonyl, β-hydroxyethylamino, γ-hydroxypropylamino, β-sulphatoethylamino, γ-sulphatopropylamino, bis-β-sulphatoethylamino, bis-β-sulphoethylamino, β-hydroxyethoxy, β-hydroxypropoxy, β-hydroxyethylthio, γ-hydroxypropylthio, β-sulphoethoxy, β-sulphatoethoxy, β-(β'-hydroxyethoxy)ethoxy, (β-hydroxyethyl)amino, β-hydroxypropylamino, β-sulphoethylamino, γ-sulphopropylamino, β-(4-sulphophenyl)-ethylamino, β-(2,4-disulphophenyl)-ethylamino, β-(2-sulpho-4-β-hydroxyethylsulphonyl)ethylamino, bis-(β-hydroxyethyl)amino, N-methyl-N-(β-hydroxyethyl)amino, N-ethyl-N-(β-hydroxyethyl)amino, N-methyl-(β-sulphoethyl)amino or N-ethyl-N-(β-sulphoethyl)amino.

The alkyl, benzyl and phenyl radicals mentioned here can themselves be further substituted, for example by NH$_2$, NHCH$_3$, OCH$_3$, OC$_2$H$_5$, SO$_3$H, COOH, NHCOCH$_3$, Cl, Br, NHSONH$_2$, OH, SCH$_3$, SO$_2$NH$_2$, CONH$^2$+N(CH$_3$)$_3$, SO$_2$CH$_2$CH$_2$OSO$_3$H. From the abundance of radicals R$^1$ and R$^2$ which are possible the following may be mentioned as examples:

4-Amino-3-sulphophenyl,
3-Amino-4-sulphophenyl,
4-(4'-Amino-3'-sulphoanilino)-3-sulphophenyl,
4-(3'-Amino-4'-sulphoanilino)-3-sulphophenyl,
4-(2'-Aminoethylamino)-3-sulphophenyl,
4-(3'-Aminopropylamino)-3-sulphophenyl,
4-(4'-Aminocyclohexylamino)-3-sulphophenyl,
4-Ethylamino-3-sulphophenyl,
4-β-Hydroxyethylamino-3-sulphophenyl,
4-β-Methoxyethylamino-3-sulphophenyl,
6-Amino-1,5-disulpho-3-naphthyl,
4-Benzylamino-3-sulphophenyl,
4-Phenoxy-3-sulphophenyl,
4-(β-Aminoethylamino)-3-(β-sulphoethylsulphamoyl)-phenyl,
4-(β-Sulphoethylamino)-3-(β-aminoethylsulphamoyl)-phenyl,
4-Ethoxy-3-(β-hydroxyethylsulphonyl)phenyl,
4-Methoxy-3-(β-sulphatoethylsulphonyl)phenyl,
4-(β-Hydroxyethylamino)-3-(β-hydroxyethylsulphonyl)phenyl.

The preparation of the 2,5-diarylaminobenzoquinones from arylamines and 1,4-benzoquinones is carried out by methods, such as are described for example in K. Venkataraman "The Chemistry of Synthetic Dyes" volume V, p. 419-427 (1971) and in Ullmanns Encyclopädie der technischen Chemie [Ullmann's Encyclopaedia of Industrial Chemistry], 4th edition, volume 8, p. 240 and 241 (1974) and also in German Offenlegungsschrift No. 2,823,828.

Thus, the 2,5-diarylaminobenzoquinones of the formula (I) where T$^1$=T$^2$=Cl are for example prepared from 2,3,5,6-tetrachlorobenzoquinone and arylamine in water at 30°-50° C., the pH being maintained at 5 to 6 by means of a basic compound, for example sodium carbonate. Compounds of the formula (I) where T$^1$=T$^2$=H can be prepared from 2,5-dihydroxybenzoquinone and an aromatic amine in glacial acetic acid at 20° to 100° C.

2,5-Diarylaminobenzoquinones having β-hydroxyethylsulphonyl or β-hydroxyethylamino radicals are sulphated before or during the cyclization.

The work-up of the reaction products obtained in the cyclization reaction is carried out by methods known per se.

The process according to the invention makes it possible to carry out cyclization under very mild conditions. It is in particular also possible to cyclize in high yields compounds I where $T^1=T^2=H$ which by the known methods (oxidizing agents: sulphur trioxide, alkali metal peroxy disulphate, sodium borate, iodine or an inorganic iodine compound) cannot be cyclized or are difficult to cyclize. Simultaneously with the cyclization, halogenation is carried out under the reaction conditions to give 6,13-dichloro- or dibromo-triphendioxazines ($T^1=T^2=Cl$, Br).

By further halogenation, in particular in the presence of catalysts (for example $I_2$), more highly halogenated triphendioxazines can be obtained.

The triphendioxazines which can be obtained according to the invention are known.

The triphendioxazines which contain sulpho groups can be used for dyeing wool or synthetic polyamides, while those which additionally contain amino groups can be used, after acylation, for example with di- or trihalotriazines or di-, tri- or tetrahalopyrimidines, for dyeing cotton.

EXAMPLE 1

58.5 parts of a condensation product prepared according to DE-A No. 3,439,756 from 48 g of 2,3,5,6-tetrachlorobenzoquinone and 102 g of 4-β-hydroxyethylamino-3β-hydroxyethylsulphonylaniline in water at a pH of 5–6 are added at 20° C. to 250 parts of 20% strength fuming sulphuric acid. Stirring is continued for one hour at 20° to 25° C., 19 parts of bromine are rapidly added to the mixture, which is stirred for 2 hours at 20° to 25° C. with slight cooling. The melt is then poured onto 800 g of ice, and the product is precipitated by adding 200 g of potassium chloride. The precipitate is filtered with suction, washed with 25% strength potassium chloride solution, and the filter cake is dried in vacuo at 60° C. The salt-containing product contains <0.1% of organic bromine and 5.4% of organic chlorine and essentially corresponds to the formula

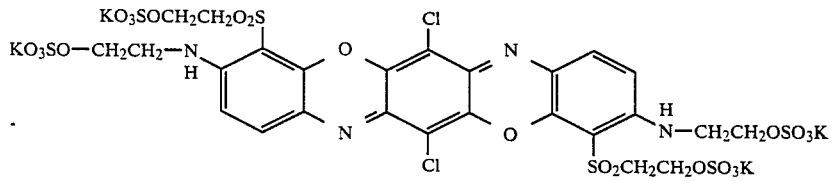

It dyes cotton in a deep blue colour having a slight red tinge.

EXAMPLE 2

(a) 50.4 parts of 2,5-dihydroxybenzoquinone and 209 parts of 87% strength 4-β-hydroxyethylamino-3-β-hydroxyethylsulphonylaniline are added at 70° C. in succession to 1 l of glacial acetic acid. The mixture is stirred for 3 hours at 70° C., cooled to 20°–25° C., filtered with suction, and the product is dried in vacuo at 50° C. The product essentially corresponds to the formula

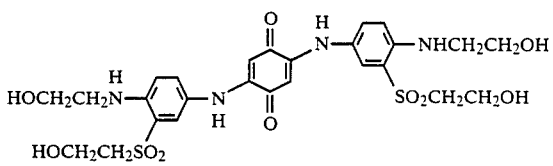

(b) 56 parts of the intermediate product prepared according to (a) are added to 250 parts of 20% strength fuming sulphuric acid. The melt is stirred at 25° C. for 1 hour. 30 parts of brom-ine-are then added in 2 portions and the mixture is stirred at 25° C. for 5 hours. The melt is poured onto 800 parts of ice to which a small amount of sodium hydrogen sulphite solution has been added. The product is salted out by adding 250 g of potassium chloride, is filtered off with suction, washed with 20% strength potassium chloride solution and dried. The salt-containing product contains 9.0% of organic bromine and essentially corresponds to the formula

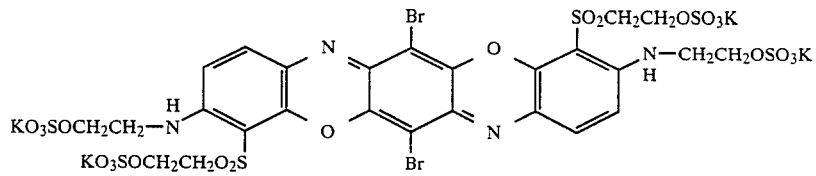

It dyes cotton in deep blue shades having a slight red tinge.

EXAMPLE 3

56 parts of the condensation product prepared according to Example (2a) are added to 300 parts of 20% strength fuming sulphuric acid, and the mixture is stirred at 15° to 20° C. for 2 hours. Chlorine is then passed in at 15° to 20° C. until, normally after 3 to 4 hours, a worked-up sample indicates complete cyclization to the triphendioxazine compound. The ready-prepared melt is poured onto 1,000 parts of ice, the product is salted out by adding 200 parts of potassium chloride, filtered off with suction, washed with 20% strength potassium chloride solution and dried in vacuo at 60° C. The product is essentially identical with the dye prepared according to Example 1.

EXAMPLE 4

If the procedure of Example 3 is repeated with the exception that before the chlorination 0.3 g of iodine is added, a more highly halogenated triphendioxazine of the following formula is obtained

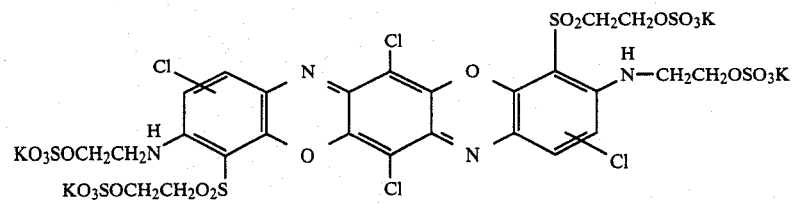

EXAMPLE 5

45 parts of a product mixture obtained according to DE-A No. 3,530,830, Example 1, by condensation of 19 parts of 1,4-diaminobenzene-2-sulphonic acid and 26 parts of 3-β-hydroxyethylsulphonyl-4-β-hydroxyethylaminoaniline with 26 parts of 2,3,5,6-tetrachlorobenzoquinone are added at 20° C. to 250 parts of 10% strength fuming sulphuric acid. Stirring is continued for 2 hours, 28 g of bromineare then rapidly added, and the mixture is stirred for 2 hours with slight cooling. After pouring onto ice, the mixture is brought to a pH of about 1.5 using calcium carbonate, and then to a pH of 5.5 using sodium carbonate. Calcium sulphate is filtered off with suction, and the filtrate is concentrated by evaporation. The salt-containing product mixture thus isolated contains the triphendioxazine of the following formula

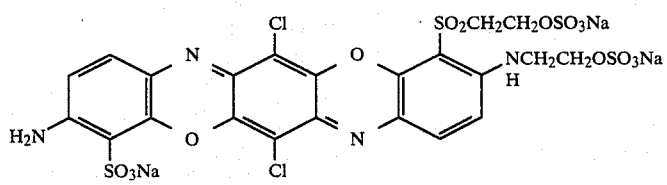

as the main component.

It dyes cotton in a deep blue colour.

We claim:

1. A process for preparing a triphenodioxazine compound comprising conducting an oxidative cyclization of a 2,5-diarylaminobenzoquinone in sulphuric acid or sulphuric acid containing sulphur trioxide, wherein the oxidizing agent is selected from the group consisting of chlorine, bromine and an inorganic bromine compound, in an amount of 0.5 to 10 moles per mole of the 2,5-diarylaminobenzoquinone and wherein the oxidation is conducted at a temperature of 0° C. to 60° C.

2. A process according to claim 1 wherein the oxidizing agent is chlorine.

3. A process according to claim 1, wherein the inorganic bromine compound is selected from the group consisting of sodium bromide, potassium bromide, sodium bromate and potassium bromate.

4. A process according to claim 1, wherein the 2,5-diarylaminobenzoquinone is of the formula

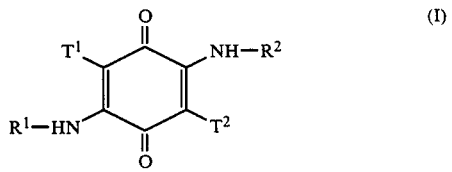

in which
$T^1$ and $T^2$ are independently of each other H, Cl, Br, $C_1$–$C_4$-alkoxy, $C_1$–$C_4$-alkyl, unsubstituted or substituted phenyl or phenoxy radicals,
$R^1$ and $R^2$ are independently of each other unsubstituted or substituted phenyl, naphthyl, carbazolyl, fluorenyl, chrysenyl or pyrenyl radicals.

5. A process according to claim 1, wherein 0.5 to 3 moles of the oxidizing agent is employed per mole of the 2,5-diarylaminobenzoquinone.

6. A process according to claim 1, wherein the temperature is 10° to 30° C.

* * * * *

UNITED STATES PATENT AND TRADEMARK OFFICE
CERTIFICATE OF CORRECTION

PATENT NO. : 4,845,213

DATED : July 4, 1989

INVENTOR(S) : Stawitz et al.

It is certified that error appears in the above-identified patent and that said Letters Patent is hereby corrected as shown below:

Col. 4, line 14         Delete "brom-ine-are" and substitute --bromine are--

Col. 5, line 20         Delete "bromineare" and substitute --bromine are --

Col. 5, line 44         Delete "triphenodioxazine" and substitute -- triphendioxazine--

Signed and Sealed this

Seventh Day of August, 1990

Attest:

HARRY F. MANBECK, JR.

*Attesting Officer*          *Commissioner of Patents and Trademarks*